Dec. 23, 1952   R. B. SEYMOUR ET AL   2,622,901
CORROSION AND SOLVENT RESISTANT PIPE JOINT
Filed Jan. 22, 1951

INVENTORS.
RAYMOND B. SEYMOUR &
WILLIS BENEDICT WALKER
BY
ATTORNEYS.

Patented Dec. 23, 1952

2,622,901

UNITED STATES PATENT OFFICE 2,622,901

CORROSION AND SOLVENT RESISTANT PIPE JOINT

Raymond B. Seymour, Allentown, and Willis Benedict Walker, Macungie, Pa., assignors to The Atlas Mineral Products Company of Pennsylvania, Mertztown, Pa., a corporation of Pennsylvania Application January 22, 1951, Serial No. 207,081

3 Claims. (Cl. 285—115)

This invention relates to improved pipe joints of the bell and spigot type.

An object of this invention is to devise an improved joint which can be readily applied by unskilled workmen and provide a much-needed method for disposal of corrosive wastes. This object is accomplished by preparing a precast joint in which provision is made for a cavity which is filled with a corrosion resistant infusible cement at the time of installation. The joint could be constructed entirely of this resinous infusible cement but such a joint would be too expensive and would lack flexibility.

Vitrified clay pipe is satisfactory as a solvent and acid reaction pipe but obviously its complete resistance is no better than the resistance of its joints. Many different products have been investigated as jointing materials for this application, but none have been completely satisfactory. Coal tar is not solvent nor corrosion resistant, Portland cement joints are not acid resistant and lack flexibility, lead pipes cannot be caulked in clay pipe and are not sufficiently corrosion resistant, and sulfur base jointing materials lack resistance to alkalies and solvents.

An attempt to overcome these deficiencies has been made by impregnating asbestos with thermosetting resinous cements and pouring a joint of a sulfur aggregate mix subsequently. This joint is fairly satisfactory but requires very careful workmanship to ascertain that the bell hole is completely filled with resinous cement before the addition of the melted sulfur cement to form the complete joint. Many joints constructed by this method failed because the alkalies and solvents contained in the pipe come in contact with the sulfur cement due to the absence of resin cements in the small sections of the bell end of the pipe adjacent to the jute.

The preferred joint is prepared from a precast sulfur aggregate bell and spigot joint joined with a furfuryl alcohol cement or other cement. Asphalt, coal tar, or plastic-aggregate compositions can be used in place of the sulfur joint and a phenol-formaldehyde or other phenolic cement may be used in place of the furfuryl alcohol cement.

Such a joint will have the physical properties, such as flexibility, of the hot-poured material and the chemical resistance of an infusible resinous cement.

Figure 1:
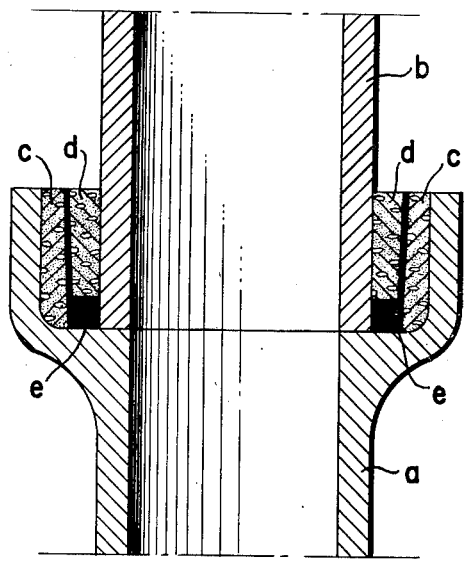
Figure 1 is a sectional view, taken on the diameter of the pipe, of the complete bell and spigot joint of the present invention.

Referring specifically to Fig. 1, $a$ and $b$ are bell and spigot portions of a pipe joint, respectively. The portions indicated by letters $c$ and $d$ are precast aggregate compositions. The letter $e$ refers to an annular space between the precast portion $b$ and the bell section of pipe $a$. This annular space is filled with furfuryl alcohol cement or other cement to form the completed joint. It will thus be seen that any liquid which happens to escape from the pipe joint, comes in contact with the furfuryl cement only and does not contact the aggregate composition.

Figure 2:
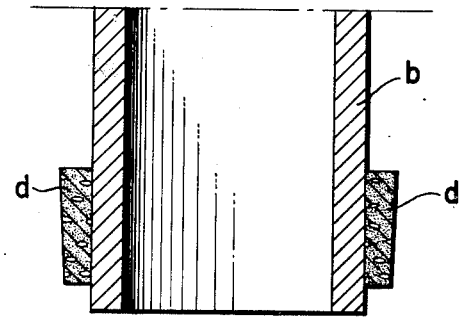
Figure 2 is a sectional view, taken on the diameter of the pipe, of the spigot end of the pipe showing the ring of aggregate composition thereon.

Figure 2 shows how the aggregate composition is placed on the spigot end of the pipe. It will be noted that the ring of aggregate material does not extend flush with the end of the pipe. A ½" to 1" section of the spigot end of the pipe is left uncovered as shown.

Special molds are employed to form the aggregates on both the bell and spigot ends of the pipe. These molds form no part of the instant invention and, therefore, are not shown or described in detail.

This invention is best illustrated by the following examples:

*Example 1.*—A molten plasticized sulfur cement is poured in the space between the pipe and molds aforementioned. These precast joints may be made at any time to a standard slipjoint pipe, but the infusible resinous cement must be mixed on the job just prior to joining the precast components. A cement such as described in U. S. Patent 2,336,049 is made by mixing an aggregate containing an acid setting agent with a solution of a resin in furfuryl alcohol. This mortar is applied to the end of the spigot and to the outer side of the spigot joint. The two components are then assembled and held in place until the resin cement sets. The setting time will vary in accordance with the temperature. This type of joint has been tested by plugging the end of the vitrified clay pipe and filling the pipe with 25% sulfuric acid, kerosene, 30% sodium hydroxide and acetone. In tests lasting for several months, no failure has ever been noted. However, when the complete joint was constructed of a sulfur cement, failure was noticed within two hours with kerosene or sodium hydroxide. Similar failures were noted with asphalt joints when kerosene or acetone were used.

Example 1 was repeated using a filled coal tar product in place of sulfur cement and also using a phenolic resinous cement and a phenolic cement in place of the furfuryl alcohol cement.

From the foregoing description, it is obvious that the improved pipe joint is capable of wide application and the scope of the invention is to be restricted only in accordance with the appended claims.

What is claimed is:

1. A bell and spigot pipe joint comprising a sulfur cement lining on the inner circumference of a bell cavity, a second sulfur cement lining on the outer periphery of a spigot centered within said bell cavity, said second lining being spaced from said first mentioned lining and spaced from the end of the spigot, a corrosion resistant synthetic resin cement forming an annular ring at the juncture of the bell and spigot and extending from the end of said spigot to said second lining, said annular ring being bonded to said linings, to the spigot and to the bell, said synthetic resin cement extending from said ring between the opposite faces of said linings and said resin cement being selected from the group consisting of a polyfurfuryl alcohol resin cement and a phenolic resin cement.

2. A bell and spigot pipe joint comprising a sulfur cement lining on the inner circumference of a bell cavity, a second sulfur cement lining on the outer periphery of a spigot centered within said bell cavity, said second lining being spaced from said first mentioned lining and spaced from the end of the spigot, a corrosion resistant synthetic resin cement forming an annular ring at the juncture of the bell and spigot and extending from the end of said spigot to said second lining, said annular ring being bonded to said linings, to the spigot and to the bell, said synthetic resin cement extending from said ring between the opposite faces of said linings and said resin cement being a polyfurfuryl alcohol resin cement.

3. A bell and spigot pipe joint comprising a sulfur cement lining on the inner circumference of a bell cavity, a second sulfur cement lining on the outer periphery of a spigot centered within said bell cavity, said second lining being spaced from said first mentioned lining and spaced from the end of the spigot, a corrosion resistant synthetic resin cement forming an annular ring at the juncture of the bell and spigot and extending from the end of said spigot to said second lining, said annular ring being bonded to said linings, to the spigot and to the bell, said synthetic resin cement extending from said ring between the opposite faces of said linings and said resin cement being a phenolic resin cement.

RAYMOND B. SEYMOUR.
WILLIS BENEDICT WALKER.

REFERENCES CITED

The following references are of record in the file of this patent:

UNITED STATES PATENTS

| Number | Name | Date |
|---|---|---|
| 340,267 | Westinghouse | Apr. 20, 1886 |
| 1,745,290 | Boyd | Jan. 28, 1930 |
| 1,971,100 | Fischer | Aug. 21, 1934 |
| 2,285,046 | Murdock | June 2, 1942 |
| 2,401,554 | Davids | June 4, 1946 |
| 2,517,778 | Fischer | Aug. 8, 1950 |